(12) United States Patent
Smith

(10) Patent No.: US 7,574,600 B2
(45) Date of Patent: Aug. 11, 2009

(54) SYSTEM AND METHOD FOR COMBINING USER AND PLATFORM AUTHENTICATION IN NEGOTIATED CHANNEL SECURITY PROTOCOLS

(75) Inventor: Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 722 days.

(21) Appl. No.: 10/808,973

(22) Filed: Mar. 24, 2004

(65) Prior Publication Data
US 2005/0216736 A1    Sep. 29, 2005

(51) Int. Cl.
*H04L 9/00* (2006.01)
*H04L 9/28* (2006.01)

(52) U.S. Cl. ............. 713/168; 713/155; 713/169; 713/170; 380/28; 380/44; 380/255; 380/259; 380/281

(58) Field of Classification Search ........... 380/255, 380/259, 281, 23, 25, 44; 713/155, 168, 713/169, 170
See application file for complete search history.

(56) References Cited

U.S. PATENT DOCUMENTS

| | | | |
|---|---|---|---|
| 4,649,233 A * | 3/1987 | Bass et al. | 713/171 |
| 7,216,369 B2 * | 5/2007 | Wiseman et al. | 726/34 |
| 2002/0184491 A1 * | 12/2002 | Morgan et al. | 713/157 |
| 2005/0063544 A1 * | 3/2005 | Uusitalo et al. | 380/277 |

* cited by examiner

*Primary Examiner*—Nasser G Moazzami
*Assistant Examiner*—Fatoumata Traore
(74) *Attorney, Agent, or Firm*—Blakely, Sokoloff, Taylor & Zafman LLP

(57) ABSTRACT

A security protocol for combining user and platform authentication. The security protocol includes a first handshake phase to issue attestation identity credentials, and a second handshake phase to authenticate based on the attestation identity credentials issued in the first handshake phase. The security protocol also includes a session resumption phase to resume a previous session.

19 Claims, 10 Drawing Sheets

US 7,574,600 B2

SYSTEM AND METHOD FOR COMBINING USER AND PLATFORM AUTHENTICATION IN NEGOTIATED CHANNEL SECURITY PROTOCOLS

BACKGROUND OF THE INVENTION

1. Field of the Invention

The present invention is generally related to channel security protocols. More particularly, the present invention is related to a system and method for combining user and platform authentication in negotiated channel security protocols.

2. Description

Traditional channel security protocols, such as SSL (Secure Sockets Layer), TLS (Transport Layer Security), and IKE (Internet Key Exchange), negotiate session keys that can be authenticated using digital certificates or shared secrets, such as a pass phrase. Authentication identifies an endpoint of communication, which can be nebulous, considering the complexity that is often associated with the storage and handling of authentication data, such as keys, tokens, secrets, etc.

Platforms containing a Trusted Platform Module (TPM) device may register a platform identity with a registration agent who may then issue an identity credential thereby binding a platform identity with a user identity. This approach provides early binding of user and platform, such that the binding persists outside of the channel used to protect client interactions with another entity. Early binding may also have privacy implications as well as usage constraints.

Traditional key exchange algorithms exchange a random secret, high in entropy, as the basis for temporal session keys. Signing the master secret with an RSA (a public-key encryption technology developed by RSA (Rivest, Shamir, and Adelman) Data Security, Inc.), DSA (Digital Signature Algorithm), or ECDSA (Elliptic Curve Digital Signature Algorithm) asymmetric key authenticates the master secret by associating it with the key holder. The key holder's identity is typically vetted by some authority who binds an asymmetric public key with an identity string, sometimes called a certificate. A public key infrastructure (PKI) may include multiple signers of certificates to capture multiple levels of delegation hierarchy (nesting) and may have multiple roots. Though these additional keys may be included in the handshake exchange, they do not sign the master secret directly, hence, do not simultaneously authenticate the endpoint.

Thus, what is needed is a system and method for combining user and platform credentials to achieve late-binding at the time a secure channel is negotiated. What is also needed is a key exchange algorithm that enables additional keys included in a handshake exchange to sign the master secret directly, thereby simultaneously authenticating the endpoint.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment", appearing in various places throughout the specification, are not necessarily all referring to the same embodiment.

Embodiments of the present invention are directed to a system and method for combining user and platform credentials to achieve late-binding at the time a secure channel is negotiated. Late binding permits a user to choose a suitable platform at the time they connect to a network. It also permits a network operator or IT manager to determine if the chosen platform is acceptable. Combining user identity, platform identity, and platform configuration provide a better definition of a communication endpoint. A remote entity may now extend a higher level of trust in the endpoint knowing that both the user and the user terminal equipment meet remote entity guidelines for security and operational integrity.

User terminal late-binding also provides a high degree of user flexibility in choosing which devices to use for various transactions. Terminal mobility increases over early binding approaches because the user-terminal binding only exists for the transaction session. The user's privacy concerns are minimized through late-binding of user identity with platform identity.

In one embodiment, the IETF (Internet Engineering Task Force) TLS (Transport Layer Security) handshake protocol may be extended to allow coordination headers and to exchange PDUs (protocol data units) containing multiple authentication keys and platform attestation data. Although embodiments of the present invention are described as being implemented as an extension to the TLS protocol, one skilled in the relevant art(s) would know that embodiments of the present invention may also be implemented in other channel security technologies, such as, but not limited to, SSL and SOAP (Simple Object Access Protocol), to extend those protocols to incorporate the exchange of PDUs containing multiple authentication keys and platform attestation data.

Figure 1:
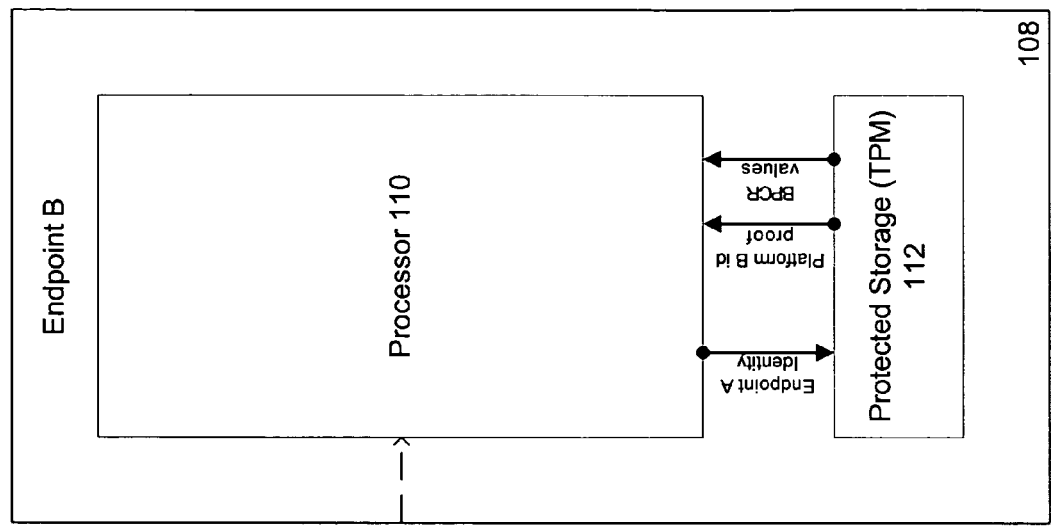
FIG. 1 is a block diagram illustrating an exemplary system in which user and platform authentication and attestation in negotiated channel security protocols may be implemented according to an embodiment of the present invention.
Figure 1:
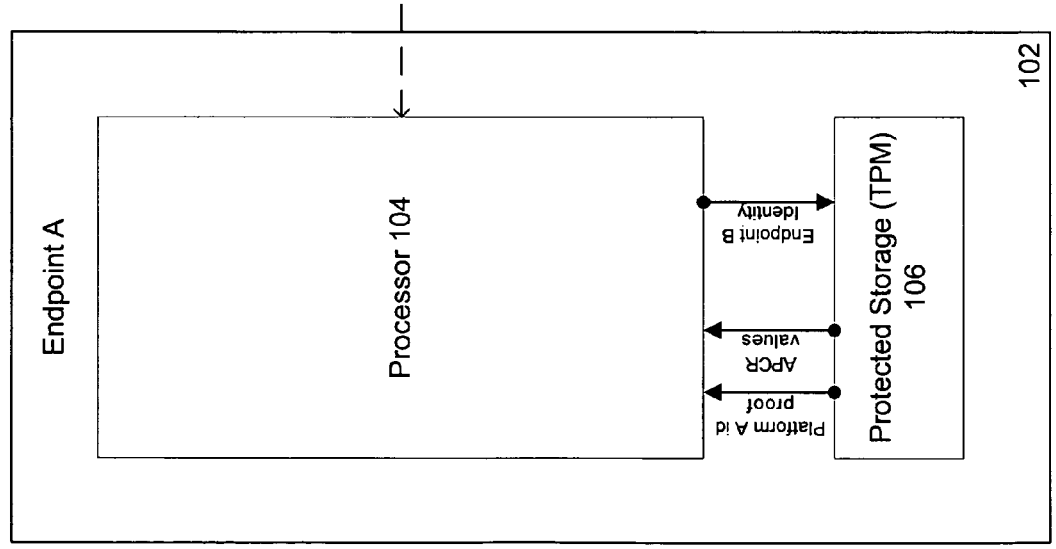

FIG. 1 is a block diagram illustrating an exemplary system 100 in which user and platform authentication in negotiated channel security protocols may be implemented according to an embodiment of the present invention. System 100 comprises an endpoint A 102 and an endpoint B 108. Endpoint A 102 comprises, inter alia, a processor 104 coupled to a protected storage (TPM (Trusted Platform Module)) device 106. Endpoint B 108 also comprises, inter alia, a processor 110 coupled to a protected storage (TPM) device 112. Endpoints A and B may be computer systems or other processing systems. In fact, in one embodiment, endpoints A and B may be programmable machines such as mobile or stationary computers, personal digital assistants (PDAs), set top boxes, cellular telephones and pagers, and other electronic devices that each include a processor and a protected storage medium readable by the processor (including volatile and non-volatile memory and/or storage elements), one or more input devices, and one or more output devices. Protected storage (TPM) devices 106 and 112 enable the registration of platform identities for endpoints A 102 and B 108 with a registration agent who issues an identity credential that binds the platform identity to a user identity.

To accomplish platform authentication using a platform identity that ties to the trusted platform module, internal exchanges between the trusted platform module and the processor occur at both endpoints A 102 and B 108. For example, with respect to endpoint A 102, processor 104 receives the identity of the platform along with some additional information that proves that the identity is legitimate, from protected storage (TPM) device 106 (which is stored on protected storage (TPM) device 106). This information is used as an input into the identity computation for processor 106. The identity of endpoint B 108, which is received through the handshake protocol, is supplied to protected storage (TPM) device 106 on endpoint A 102. This allows protected storage (TPM) device 106 to decrypt encrypted information. Processor 110 seals or binds the information of endpoint 108 that is sent to protected storage (TPM) device 106 on endpoint A 102. Protected storage (TPM) device 106 decrypts the information using the public key of processor 110. Protected storage (TPM) device 106 doesn't really process the data, it just decrypts the data and hands it back to processor 104. A similar process occurs to authenticate the platform identity that ties to TPM 112 on endpoint B 108.

As previously indicated, embodiments of the present invention allow applications to communicate between endpoint A 102 and endpoint B 108 in a secure manner. According to embodiments of the present invention, endpoint A 102 and endpoint B 108 securely communicate with each other by combining multiple facets of endpoint descriptions, such as user and platform identity in authentication and platform attestation, and linking that authentication with a secure channel (shown in FIG. 1 as a dotted line 114).

Thus, according to one embodiment of the present invention, three assertions may be enforced. The three assertions include user authentication, platform authentication, and platform configuration. In one embodiment, only platform authentication may be asserted. In another embodiment, both platform authentication and user authentication may be asserted. In another embodiment, both platform configuration and platform authentication may be asserted. In yet another embodiment, platform authentication, platform configuration, and user authentication may all be asserted.

Figure 2:
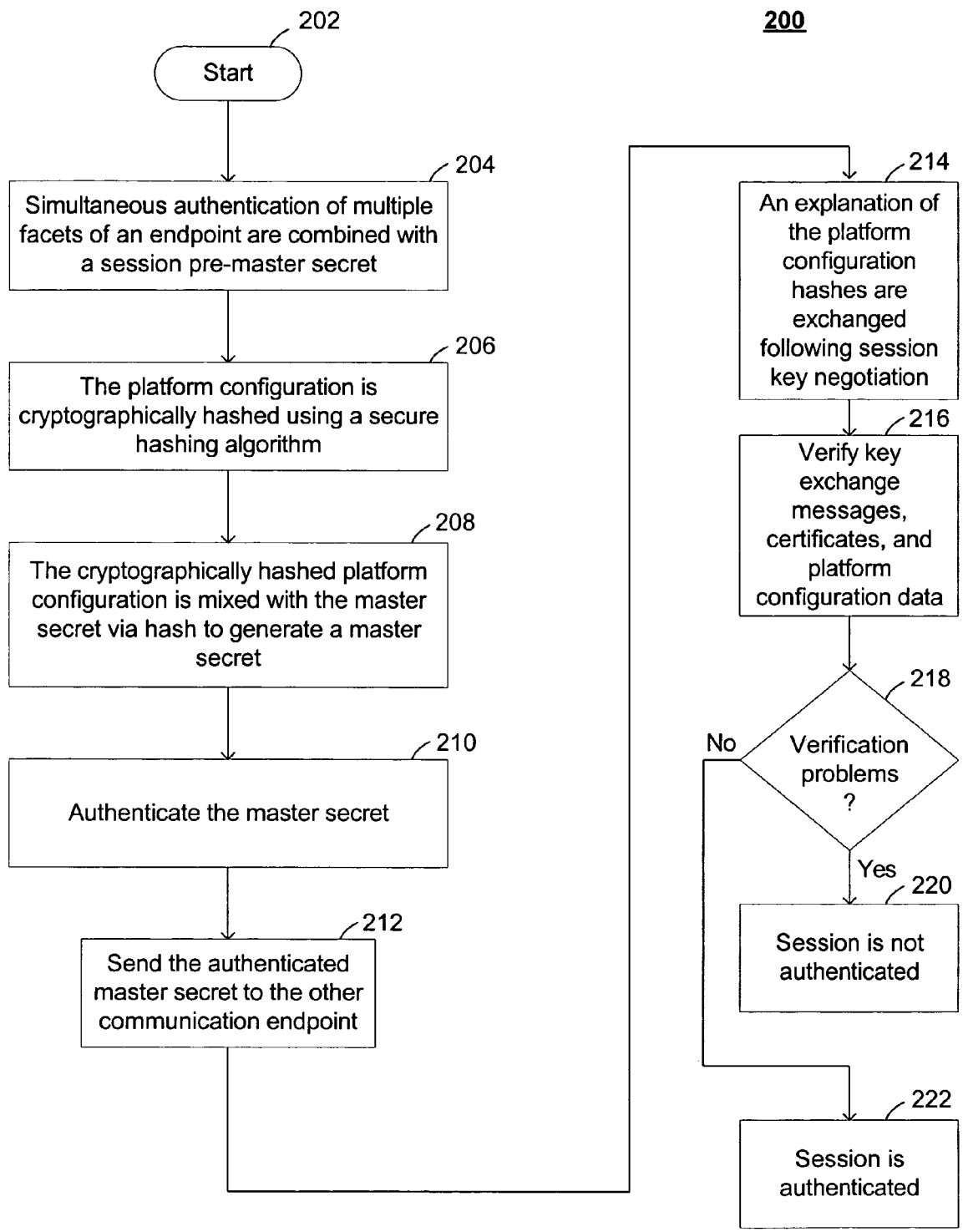
FIG. 2 is a flow diagram describing an exemplary method for combining user and platform authentication and attestation in negotiated channel security protocols according to an embodiment of the present invention.

FIG. 2 is a flow diagram 200 describing an exemplary method for combining user and platform authentication in negotiated channel security protocols according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, simultaneous authentication of multiple facets of an endpoint are combined with a session pre-master secret (pre-MS). The process then proceeds to block 206.

A platform private key is bound to a platform using a TPM (Trusted Platform Module) device, such as, for example, protected storage 106 and 112 to provide tamper-resistant storage and digital signing. In block 206, the platform configuration is cryptographically hashed using a secure hashing algorithm, such as, but not limited to, Secure Hash Algorithm—Version 1.0 (SHA-1). In other embodiments, other secure hashing algorithms may be used. The cryptographically hashed platform configuration is mixed with the pre-master secret via hash to generate a master secret (block 208).

In block 210, the new master secret authentication token is generated and used to authenticate the negotiated channel. For example, in one embodiment, the master secret is digitally signed using one or more certified keys. In one embodiment, the master secret may be digitally signed with both a user key and a platform key. In another embodiment, the master secret may be digitally signed with a platform key. In yet another embodiment, the master secret may be digitally signed with a user key. In an embodiment in which a platform may contain multiple identities, the master secret may be signed by one platform identity key. In another embodiment in which the platform may contain multiple identities, the master secret may be signed by one or more platform identity keys. In yet another embodiment in which the platform may contain multiple identities, the master secret may be signed by each platform identity key. The process then proceeds to block 212.

In block 212, the encrypted master secret is sent to the other endpoint of the communication channel, where the encrypted master secret may be decrypted. Each endpoint uses the master secret to generate the session keys.

In block 214, an explanation of the platform configuration hashes are exchanged following session key negotiation to finalize the authentication. The process then proceeds to block 216.

In block 216, key exchange messages, certificates, and platform configuration data at each endpoint are verified. The process then proceeds to decision block 218.

In decision block 218, it is determined whether problems exist with the verification. If it is determined that problems exist with the verification, then the process proceeds to block 220, where the session is not authenticated. In this case, neither endpoint is allowed to exchange application data.

Returning to decision block 218, if it is determined that no problems exist with the verification, the process proceeds to block 222. In block 222, the session is authenticated. In this case, either endpoint is allowed to exchange application data.

Embodiments of the present invention provide a handshake protocol extension for attestation that includes a bi-directional handshake protocol for registration, a bidirectional handshake protocol for platform authentication and attestation, and a bi-directional handshake protocol for session resumption. The bi-directional handshake protocol for registration and the bi-directional handshake protocol for authentication and attestation are performed for new communication sessions between client/server or peers, while the bidirectional handshake protocol for session resumption is performed when a previous session between client/server or peers is to be resumed. The extension of the handshake protocol performs platform identity registration and authentication of the platform independent of user or application authentication. The extension supports symmetric exchange of AIK (attestation identity key) credentials between client and server (or other peer-to-peer communications) and exchanges system integrity information that may be used to determine if the endpoint configuration is acceptable.

Figure 3A:
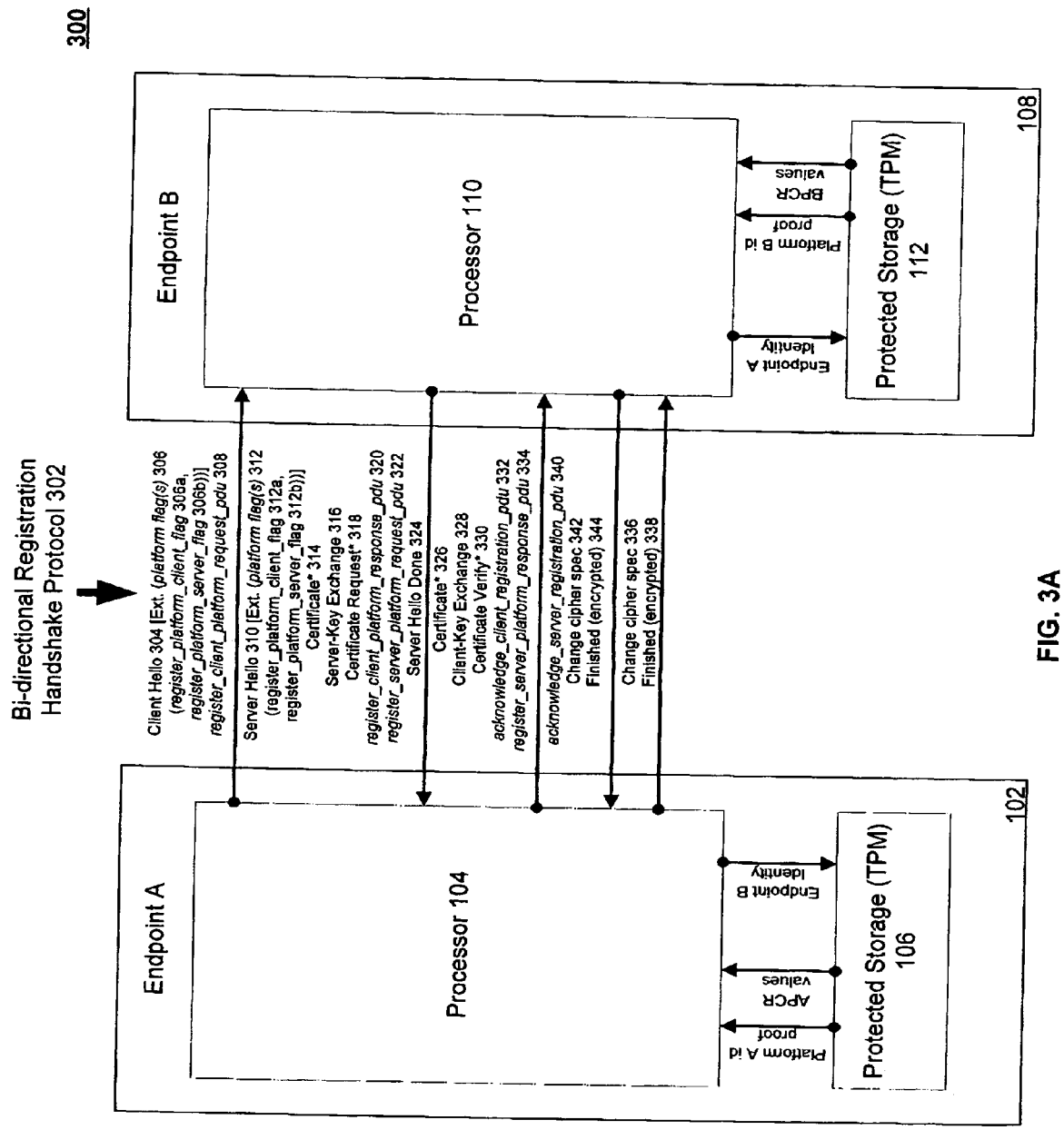
FIG. 3A is a diagram illustrating an exemplary bi-directional registration handshake protocol according to an embodiment of the present invention.

FIG. 3A is a diagram 300 illustrating an exemplary TLS handshake protocol during bi-directional registration according to an embodiment of the present invention. As previously indicated, although embodiments of the present invention are described using TLS, other handshake protocols may also be used. Diagram 300 identifies the extensions to the existing TLS handshake protocol in italics. The extensions issue the credentials and perform platform identity registration.

As shown in FIG. 3A, diagram 300 comprises endpoint A 102, endpoint B 108, and a bidirectional registration handshake protocol 302 between endpoint A 102 and endpoint B 108 that enables client/server or peer-to-peer communications between the two endpoints (A 102 and B 108). Handshake protocol 302 is described with endpoint A 102 acting as a client and endpoint B 108 acting as a server. Although the protocol is described as a client/server implementation, peer-to-peer implementations may also be used.

Handshake protocol 302 enables endpoint A 102 (also referred to as "the client") and endpoint B 108 (also referred to as "the server") to communicate their need to register with each other. They may also communicate that they are capable of registering others as well. Thus, handshake protocol 302 is a bilateral protocol that enables endpoint A 102 to register endpoint B 108 and endpoint B 108 to register endpoint A 102. Handshake protocol 302 comprises a client hello message 304, a register_client_platform_request_pdu 308, a server hello message 310, a certificate 314, a server-key exchange message 316, a certificate request 318, a register_client_platform_response_pdu 320, a register_server_platform_request_pdu 322, a server hello done message 324, a certificate 326, a client-key exchange message 328, a certificate verify 330, an acknowledge_client_registration_pdu 332, a register_server_platform_response_pdu 334, a client change cipher spec message 336, a client finished message 338, an acknowledge_server_registration_pdu 340, a server change cipher spec message 342, and a server finished message 344. Each of the above-listed pdus (protocol data units) is an attestation protocol data unit according to embodiments of the present invention. The handshake structures for the pdus are based on the TLS Extensions, RFC 3546, currently available at www--ietf--org/rfc/rfc3546.txt, where the periods in the URL have been replaced with "--" to avoid inadvertent hyperlinking, dated Jun. 2003. The remaining messages are TLS protocol messages as defined in The TLS Protocol Version 1.0, RFC 2246, currently available at www--ietf--org/rfc/rfc2246.txt, where the periods in the URL have been replaced with "--" to avoid inadvertent hyperlinking, dated Jan. 1999.

Communication between endpoint A 102 and endpoint B 108 may begin with an exchange of hello messages. Hello messages are used to exchange security enhancement capabilities between a client and a server. For example, hello messages are used to agree on algorithms, such as, but not limited to, key exchange algorithms, a bulk encryption algorithm (which includes a secret key length), and a MAC (Message Authentication Code) algorithm. Hello messages may also include the exchange of random values, and a check for session resumption. Embodiments of the present invention extend the hello messages to include platform registration.

Handshake protocol 302 begins with a client hello message 304 from endpoint A 102 to endpoint B 108. Client hello message 304 is sent when endpoint A 102 first connects to endpoint B 108. Client hello message 304, which is well known in the relevant art(s), may include, but is not limited to, a current time and date, a random variable, a session identifier (ID) (if the session is being resumed), a cipher suite list containing a combination of cryptographic algorithms supported by the client in order of the client's preference, and a list of compression algorithms supported by the client and ordered according to the client's preference.

Client hello message 304 is extended to include registration platform flags 306. Registration platform flag(s) 306 include register_platform_client_flag 306a and register_platform_server_flag 306b. Register_platform_client_flag 306a indicates to the server (endpoint B 108) that the client (endpoint A 102) wants to register with the privacy certificate authority (CA) and get an AIK (attestation identity key) credential. Register_platform_server_flag 306b indicates to the server (endpoint B 108) that the client (endpoint A 102) has the capability of registering and thus issuing AIK credentials.

Register_client_platform_request_pdu 308 is an attestation protocol data unit extension. Register_client_platform_request_pdu is sent from endpoint A 102 to endpoint B 108. Register_client_platform_request_pdu 308 is a request from endpoint A 102 to register the platform from endpoint A 102 with endpoint B 108. Register_client_platform_request_pdu 308 carries an encrypted message required for AIK credential creation. The encryption is done by the Attester's (Privacy CA) public key. The message includes, for example, an AIK (attestation identity key) and an identity proof for endpoint A 102. The identity proof includes all the information necessary to validate the AIK, such as, for example, a public key for an embedded endorsement key.

A server hello message 310 is sent from endpoint B 108 to endpoint A 102 in response to client hello message 304. Server hello message 310, which is well known in the relevant art(s), may include, but is not limited to, a random variable generated by endpoint B 108, a session ID identifying a new session, a single cipher suite selected by endpoint B 108 from the list in client hello 304, and a single compression algorithm selected by endpoint B 108 from the list in client hello 304.

Server hello message 310 may be extended to include platform flags 312 for attestation. Platform flags 312 include register_platform_client_flag 312a and register_platform_server_flag 312b, which are similar to platform flags 306. That is, register_platform_client_flag 312a indicates to the client that the server wants to register with the privacy CA and get an AIK credential. Register_platform_server_flag 312b indicates to the client that the server has the capability of registering and thus issuing AIK credentials.

Certificate 314, which is well known, is an optional TLS handshake message that may be sent from endpoint B 108 to endpoint A 102. Certificate 314 may be sent whenever an agreed-upon key exchange method (defined by the cipher suite selection) is not an anonymous one.

Server-Key Exchange 316, which is a TLS handshake message, is sent from endpoint B 108 to endpoint A 102. Server-Key Exchange 316 comprises cryptographic information to allow endpoint A 102 to communicate a pre-master secret to endpoint B 108.

Certificate request 318, which is a TLS handshake message, is an optional handshake message that may be sent from endpoint B 108 to endpoint A 102. Certificate request 318 allows a non-anonymous server to optionally request a certificate from endpoint A 102, if it is appropriate for the selected cipher suite.

Register_client_platform_response_pdu 320 is an attestation protocol data unit extension. Register_client_platform_response_pdu 320 is sent from endpoint B 108 to endpoint A 102 to indicate that endpoint B 108 is registering endpoint A 102. Register_client_platform_response_pdu 320 may include information having a symmetric key encrypted with a Public EK (Endorsement Key) of the requestor (i.e., endpoint B) and information consisting of the AIK credential encrypted with the symmetric key. The public EK is the public portion of a public/private key pair that manufacturer of a platform creates. The public/private pair may be used to establish the platform identity. Register_client_platform_response_pdu 320 may also include additional information. The additional information may include one or more of identity information, privilege assignments to enable the holder of the credential to assert that it has some authorization, a date in which the credential will expire, etc. Endpoint A 102 will be able to decrypt register_client_platform_response_pdu 320 using the corresponding private key.

Register_server_platform_request_pdu 322 is an attestation protocol data unit extension. Register-server_platform_request_pdu is sent from endpoint B 108 to endpoint A 102 as a request from to register its platform with endpoint A 102. Register_server_platform_request_pdu 322 carries an encrypted message required for AIK credential creation. The encryption is done by the Attester's (Privacy CA) public key. The message includes, for example, an AIK (attestation identity key) and an identity proof for endpoint B 108. The identity proof includes all the information necessary to validate the AIK, such as, for example, a public key for an embedded endorsement key.

A server hello done message 324, which is a TLS protocol message, is sent from endpoint B 108 to endpoint A 102. Server hello done message 324 indicates the conclusion of server hello message 310 and associated messages (314, 316, 318, 320, and 322).

Certificate 326, which is a TLS protocol message, is an optional handshake message that may be sent from endpoint A 102 to endpoint B 108. If endpoint A does not have a suitable client certificate, then endpoint A may send certificate 326 as a message that contains no certificate.

Client-Key Exchange 328, which is a TLS protocol message, is sent from endpoint A 102 to endpoint B 108. Client-Key Exchange 328 provides a pre-master secret to endpoint B 108. Endpoint A 102 generates the pre-master secret and encrypts the pre-master secret with a public key from server certificate 326, if used, or with a temporary key provided in Server-Key Exchange 316. Endpoint B 108 may decrypt the pre-master secret using a corresponding private key from server certificate 326 or Server-Key Exchange 316. The pre-master secret is used to generate a master secret.

Certificate Verify 330, which is a TLS protocol message, is an optional handshake message sent from endpoint A 102 to endpoint B 108. Certificate Verify 330 may be sent following a client certificate, such as Certificate 326, that has signing capability.

Acknowledge_client_registration_pdu 332 is an attestation protocol data unit extension. Acknowledge_client_registration_pdu 332 is sent from endpoint A 102 to endpoint B 108 and sends a message containing an AIK credential acknowledgement to let endpoint B 108 know that authentication was successful. The AIK credential acknowledgement is used to prevent an identity theft threat. An identity theft threat may be a spoofed client that performs the protocol using an EK that is stolen from a valid TPM to try to induce the server into issuing a credential that would otherwise not be issued. Acknowledge_client_registration_pdu 332 finishes the authentication with endpoint B 108 by letting endpoint B 108 know that endpoint A 102 is who it claims it is.

Register_server_platform_response pdu 334 is an attestation protocol data unit extentsion. Register_server_platform_response is sent from endpoint A 102 to endpoint B 108 to indicate that endpoint A 102 is registering endpoint B 108. Register_server_platform_response_pdu 334 may include information having a symmetric key encrypted with a public EK (Endorsement Key) of the requestor (i.e., endpoint A) and information consisting of the AIK credential encrypted with the symmetric key. As previously indicated, the public EK is the public portion of a public/private key pair that a manufacturer of a platform creates. The public/private pair is used to establish the platform identity. Register_server_platform_response_pdu may also include additional information. The additional information may include one or more of identity information, privilege assignments to enable the holder of the credential to assert that it has some authorization, a date in which the credential will expire, etc. Endpoint B 108 will be able to decrypt register_server_platform_response_pdu 334 using the corresponding private key.

Acknowledge_server_registration_pdu 340 is an attestation protocol data unit extension. Acknowledge_server_registration_pdu 340 is sent from endpoint B 108 to endpoint A 102. Acknowledge_server_registration_pdu 340 sends a message containing an AIK credential acknowledgement to let endpoint B 108 know that authentication was successful. The AIK credential acknowledgement is used to prevent an identity theft threat in a manner similar to acknowledge_client_registration_pdu 332. Acknowledge_server_registration_pdu 340 finishes the authentication with endpoint A 102 by letting endpoint A 102 know that endpoint B 108 is who it claims it is.

Change cipher spec 342, which is a TLS protocol message, is sent during the handshake after the security parameters for endpoint B 108 have been agreed upon and before a finished message is sent. Change cipher spec 342 is sent from endpoint B 108 to endpoint A 102 to notify endpoint A 102 that subsequent communications will be protected under the newly negotiated cipher spec and keys.

Finished 344, which is a TLS protocol message, is an encrypted message sent from endpoint B 108 to endpoint A 102 after change cipher spec 342. Finished 344 verifies that the key exchange and registration processes were successful on endpoint B 108.

Change cipher spec 336, which is a TLS protocol message, is sent during the handshake after the security parameters for endpoint A 102 have been agreed upon and before a finished message is sent. Change cipher spec 336 is sent from endpoint A 102 to endpoint B 108 to notify endpoint B 108 that subsequent communications will be protected under the newly negotiated cipher spec and keys.

Finished 338, which is a TLS protocol message, is an encrypted message sent from endpoint A 102 to endpoint B 108 after change cipher spec 336. Finished 338 verifies that the key exchange and registration processes were successful on endpoint A 102.

Figure 4A:
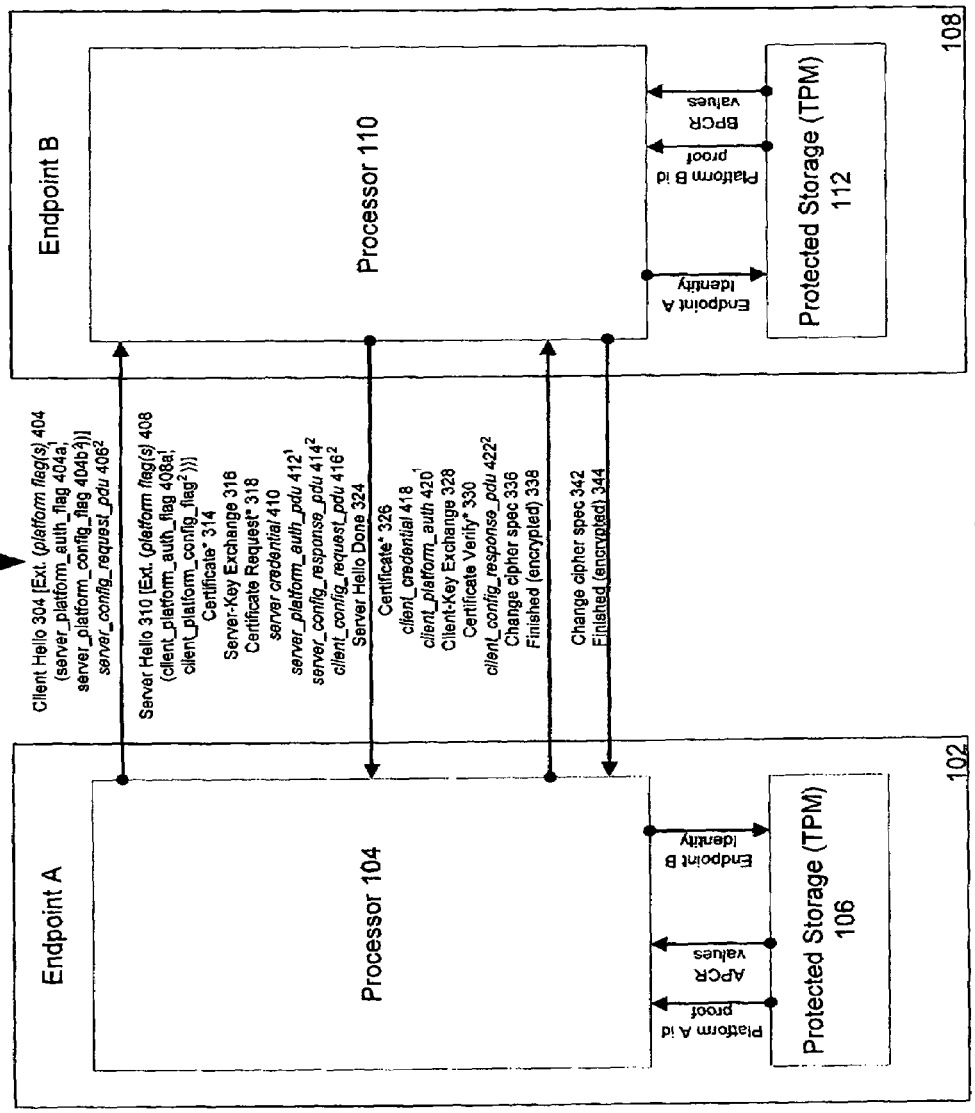
FIG. 4A is a diagram illustrating an exemplary bi-directional platform authentication and attestation handshake protocol according to an embodiment of the present invention.

FIG. 4A is a diagram 400 illustrating exemplary TLS handshake protocol messages during bi-directional platform authentication and attestation according to an embodiment of the present invention. Although embodiments of the present invention are described using TLS, other handshake protocols may also be used. Diagram 400 identifies the extensions to the existing TLS handshake protocol in italics. The extensions incorporate platform identity authentication and attestation. Attestation includes the combination of authenticating the platform and identifying attributes of the platform that are used to make trust decisions. Thus, the bidirectional platform authentication and attestation handshake authenticates based on the credentials that were issued in bidirectional registration handshake protocol 302 (described above with reference to FIG. 3A) and reports the platform identity and platform configuration state.

Diagram 400 comprises endpoint A 102 communicating with endpoint B 108 through a bi-directional platform authentication and attestation handshake protocol 402. As indicated above with reference to FIG. 3A, handshake protocol 402 is described with endpoint A 102 acting as the client and endpoint B 108 acting as the server. Although the protocol is described as a client/server implementation, peer-to-peer implementations may also be used. Handshake protocol 402 comprises client hello message 304, a server_config_request_pdu 406, server hello message 310, certificate 314, server-key exchange 316, certificate request 318, a server_credential_pdu 410, a server_platform_auth_pdu 412, a server_config_response_pdu 414, a client_config_request_ pdu 416, server hello done message 324, certificate 326, a client_credential_pdu 418, a client_platform_auth_pdu 420, client-key exchange message 328, certificate verify 330, a client_config_response_pdu 422, change cipher spec 336, finished message 338, change cipher spec message 342, and finished message 344. As previously indicated, each of the above-listed pdus (protocol data units) is an attestation protocol data unit according to embodiments of the present invention. The handshake structures for the pdus are based on the TLS Extensions, RFC 3546, currently available at www--ietf--org/rfc/rfc3546.txt, where the periods in the URL have been replaced with "--" to avoid inadvertent hyperlinking, dated Jun. 2003. The remaining messages are TLS protocol messages as defined in The TLS Protocol Version 1.0, RFC 2246, currently available at www--ietf--org/rfc/rfc2246.txt, where the periods in the URL have been replaced with "--" to avoid inadvertent hyperlinking, dated Jan. 1999.

In one embodiment, a client and server advertise that they have the ability to process platform authentication and/or platform configuration reporting using two sets of extension flags during handshake 402. In embodiments where only authentication is to be performed, all handshake messages superscripted with a 1 are mandatory and all handshake messages superscripted with a 2 are not needed. Alternatively, in embodiments where only platform configuration reporting is to be done, all handshake messages superscripted with a 2 are mandatory and all handshake messages superscripted with a 1 are not needed. In embodiments where both authentication and platform configuration reporting are to be performed, all handshake messages superscripted with a 1 and a 2 are mandatory.

Handshake protocol 402 begins with client hello 304. As previously indicated, client hello 304 is sent from endpoint A 102 to endpoint B 108. Client hello 304 is accompanied by extension platform flag(s) 404. Extension platform flags 404 include server_platform_auth_flag 404a (not shown) and server_platform_config_flag 404b (not shown). Server_platform_auth_flag indicates that endpoint B 108 has to send the platform authentication, i.e., AIK credential, and associated proof. Server_platform_config_flag indicates that endpoint B 108 has to send its platform configuration signed by the AIK credential.

Server_config_request_pdu 406, which is an attestation pdu extension, is sent from endpoint A 102 to endpoint B 108. Server_config_request_pdu 406 comprises a message carrying PCR (platform configuration register) selections and trusted root key identifiers that the client (i.e., endpoint A 102) may possess.

Server hello 310 is sent from endpoint B 108 to endpoint A 102. Server hello 310 is accompanied by extension platform flag(s) 408. Extension platform flags 408 include client_platform_auth_flag 408a and client_platform_config_flag 408b. Client_platform_auth_flag 408a indicates that endpoint A 102 has to send the platform authentication, i.e., AIK credential, and associated proof for the AIK credential to endpoint B 108. Client_platform_config_flag 408b indicates that endpoint A 102 has to send the platform configuration signed by the AIK credential.

Server credential 410, which is an attestation extension pdu, is sent from endpoint B 108 to endpoint A 102. Server credential 410 comprises an encoded X.509 AIK credential for endpoint B 108.

Server_platform_auth_pdu 412 is an attestation extension pdu. It is sent from endpoint B 108 to endpoint A 102. Server_platform_auth_pdu 412 comprises an encoded authentication for the AIK credential for endpoint B 108. The encoded authentication may include a certificate signing key (CSK) signed by the AIK and a hash of all previous handshake (HS) messages signed by the CSK.

Server_config_response_pdu 414 is an attestation extension pdu that is sent from endpoint B 108 to endpoint A 102. Server_config_response_pdu 414 comprises encoded PCR (platform configuration register) values for endpoint B 108 and may optionally include encoded IML (Integrity Measurement Log) values or an IML Link. IML is a log containing attributes of platform components. The platform components may include, but are not limited to, information in flash and program loaders or other code & data. The IML is used by a verifier to validate information that was contained in PCR registers. In one embodiment, there may be more than one IML, but logically it is a single log file. In an embodiment, the IML values may be NULL values.

Client_config_request_pdu 416, which is an attestation extension pdu, is sent from endpoint B 108 to endpoint A 102. Client_config_request_pdu 416 comprises encoded PCR selections and encoded trusted root key identifiers that the server (i.e., endpoint B 108) may possess.

Client credential 418 is an attestation extension pdu. It is sent from endpoint A 102 to endpoint B 108. Client credential 418 comprises an encoded x.509 AIK credential for endpoint A 102.

Client_platform_auth_pdu 420, which is an attestation extension pdu, is sent from endpoint A 102 to endpoint B 108. Client_platform_auth_pdu 420 comprises encoded authentication information for the AIK credential for endpoint A 102.

The authentication information includes a certificate signing key (CSK) signed by the AIK and a hash of all previous HS messages signed by the CSK.

Client_config_response_pdu 422 is an attestation extension pdu. Client_config_response_pdu 422 is sent from endpoint A 102 to endpoint B 108. Client_config_response_pdu 422 comprises encoded PCR values of endpoint 102 A and may optionally include encoded IML values or an IML Link. In one embodiment, IML values may comprise NULL values.

Figure 5:
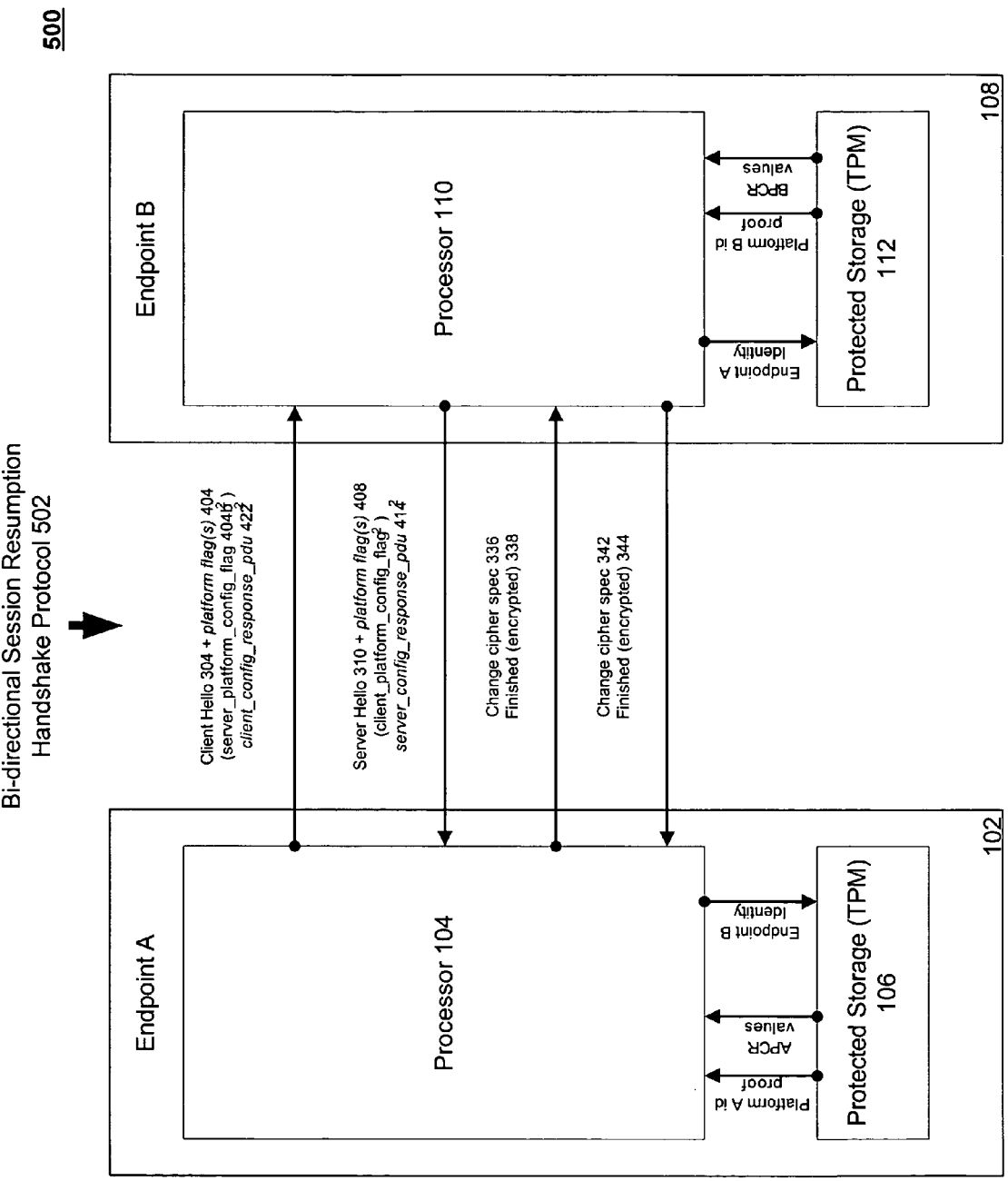
FIG. 5 is a diagram illustrating an exemplary bi-directional resumption handshake protocol according to an embodiment of the present invention.

FIG. 5 is a diagram 500 illustrating TLS handshake protocol messages during bi-directional session resumption according to an embodiment of the present invention. Although embodiments of the present invention are described using TLS, other handshake protocols may also be used. Diagram 500 identifies extensions to the existing TLS handshake protocol in italics. The extensions incorporate platform identity authentication and attestation.

Shown in FIG. 5 are endpoint A 102, endpoint B 108, and a session resumption handshake protocol 502. Session resumption handshake protocol 502 is used to resume a previous session. In one embodiment, session resumption handshake protocol 502 is a simplified version of bi-directional platform authentication and attestation handshake protocol 402 because the previous criteria for which the session security was based is being resumed. This simplifies session resumption handshake protocol 502, while ensuring that platform operational states remain constant.

Session resumption handshake protocol 502 comprises client hello message 304, which includes platform flags 404b, client_config_response_pdu 422, server hello message 310, which includes platform flag 408b, server_config_response_pdu 414, change cipher spec message 336, finished message 338, change cipher spec message 342, and finished message 344, all of which were described in either FIG. 3A or FIG. 4A above.

In one embodiment of the present invention, all attestation platform data units are XML (Extensible Markup Language) encoded. In another embodiment of the present invention, all attestation platform data units are SOAP messages containing XML code.

In embodiments of the present invention, platform configuration may have a determining factor as to whether or not the client/server side can trust the platform of the server/client side, respectively. For example, if processor 104 of endpoint A 102 contains a BIOS (basic input/output system) that has some known bugs in it, then endpoint B 108 may decide not to continue on with the handshake because endpoint B 108 knows that the platform from endpoint A 102 may be easily compromised because of the bugs.

When all of the platform and user identity information have been exchanged, both endpoint A 102 and endpoint B 108 may make an informed decision whether to terminate the handshake protocol. If the handshake protocol continues, meaning neither the client nor the server wants to terminate the handshake, then the session keys will be created to enable the exchange of data between endpoints A 102 and B 108. For example, using the above-described implementation for a new session, endpoints A 102 and B 108 may create the session keys using a master secret, which is described below with reference to FIGS. 6 and 7. In one embodiment, endpoint A 102 may add some randomness to the session keys and sends the session keys back to endpoint B 108. At this point, both sides have the same session keys and can exchange data. All of the data that is exchanged is hashed and the session key is used to encrypt the data to provide both an encryption and a MAC (message authentication code). So basically a symmetric data integrity computation is performed. Both the client and the server are able to exchange data knowing that both platforms have been authenticated using a platform identity that ties to the trusted platform module (which may be, for example, silicon) and optionally with user authentication information. The ability now exists to have a security policy that ties the user to a platform and allows the determination of which configuration of platforms will be trusted.

Figure 6:
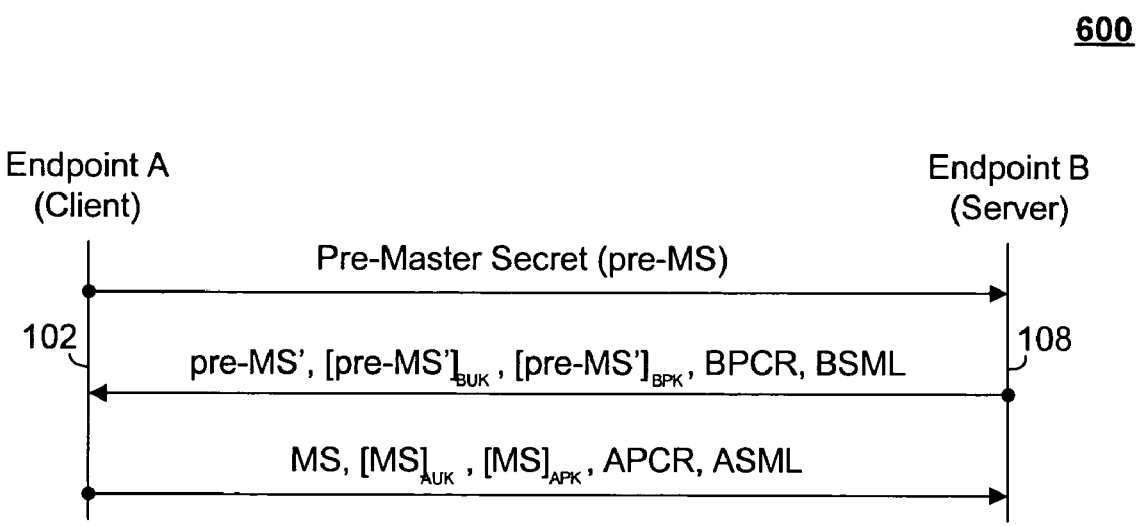
FIG. 6 is a diagram illustrating an exemplary multiple identity (User+Platform) exchange protocol according to an embodiment of the present invention.

The server_key_exchange and client_key_exchange messages are modified to include multi-faceted authentication proof, namely, use of platform identity keys in conjunction with user identity keys. FIG. 6 is a diagram illustrating an exemplary multiple identity (User+Platform) exchange protocol according to an embodiment of the present invention. A pre-master secret (pre-MS) is sent from endpoint A 102 to endpoint B 108. The pre-master secret is used to generate a modified pre-master secret (pre-MS)'. Thus, as shown in FIG. 6, the (pre-MS)' is returned to endpoint A 102 along with the (pre-MS)' encrypted using a user key of endpoint B 108 (BUK), the (pre-MS)' encrypted using the platform key of endpoint B 108 (BPK), a hash value of the platform configuration register (which is found in the TPM) from endpoint B 108 (BPCR), and a stored measurement log for endpoint B 108 (BSML) which is the actual value of the configuration from which the hash was computed. Although not explicitly shown in FIG. 6, the BPCR value is also signed. So even if an attacker changed the stored measurement log information, it would be detected because the PCR values are signed. The (pre-MS)' value that is passed from endpoint B 108 to endpoint A 102 is used by endpoint A 102 to generate the MS. The MS is then sent to endpoint B 108 along with the MS encrypted by the user key of endpoint A 102 (AUK), the MS encrypted by the platform key of endpoint A 102 (APK), a hash value of the platform configuration register (found in the TPM) from endpoint A 102 (APCR), and a stored measurement log for endpoint A 102 (ASML), which is the actual value of the configuration from which the hash was computed. Both endpoints (A 102 and B 108) verify the handshake messages received from the other side. Thus, the user keys and the platform keys are used to encrypt the master secret to authenticate both users and both platforms. The PCRs from both sides are used to authenticate the configuration. All of that information is hashed into the master secret and then, upon verification, the session keys are generated.

Figure 7A:
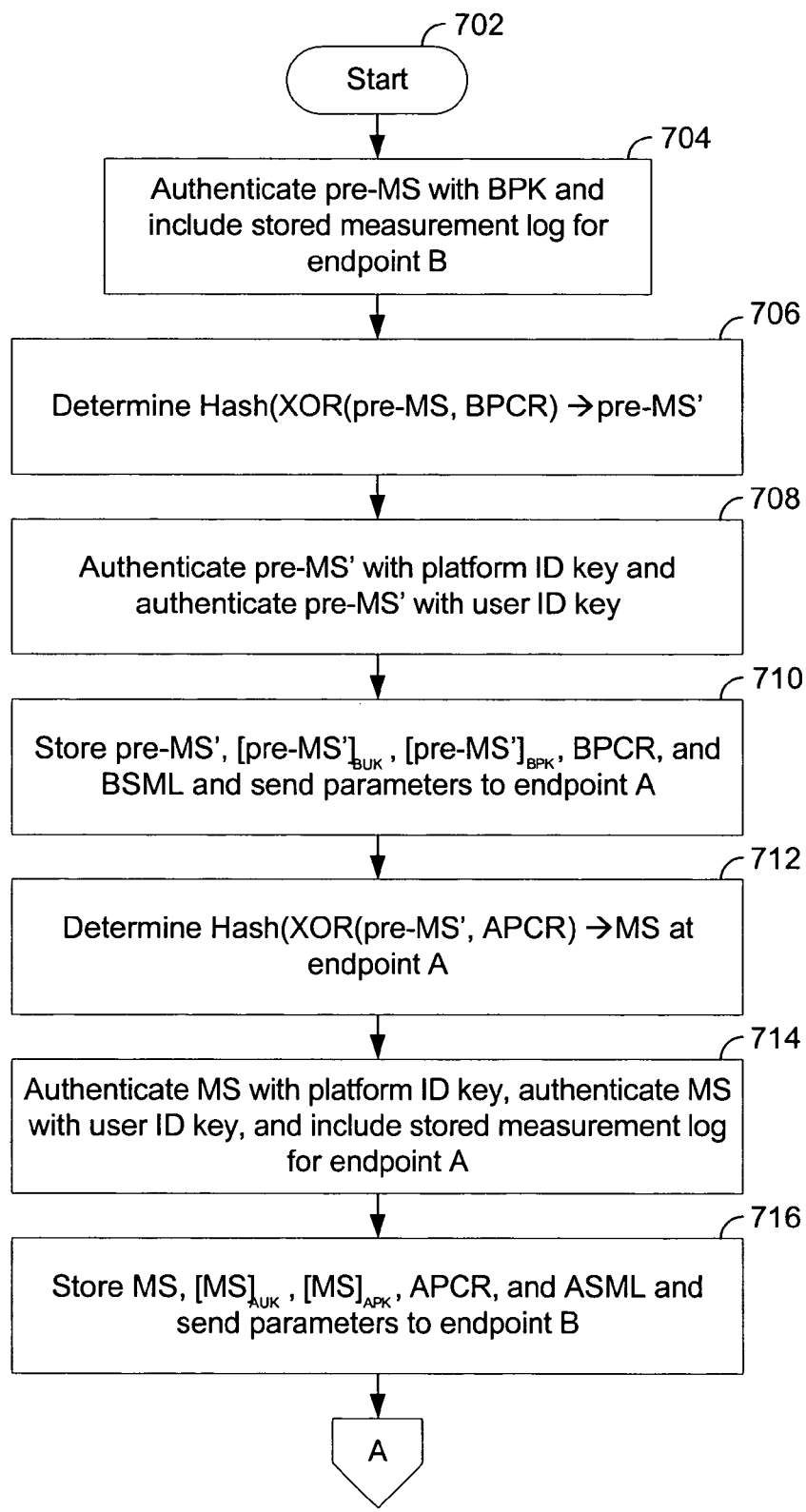
FIGS. 7A and 7B are a flow diagram describing an exemplary method for authenticating multiple identities using RSA identity keys according to an embodiment of the present invention.
Figure 7B:
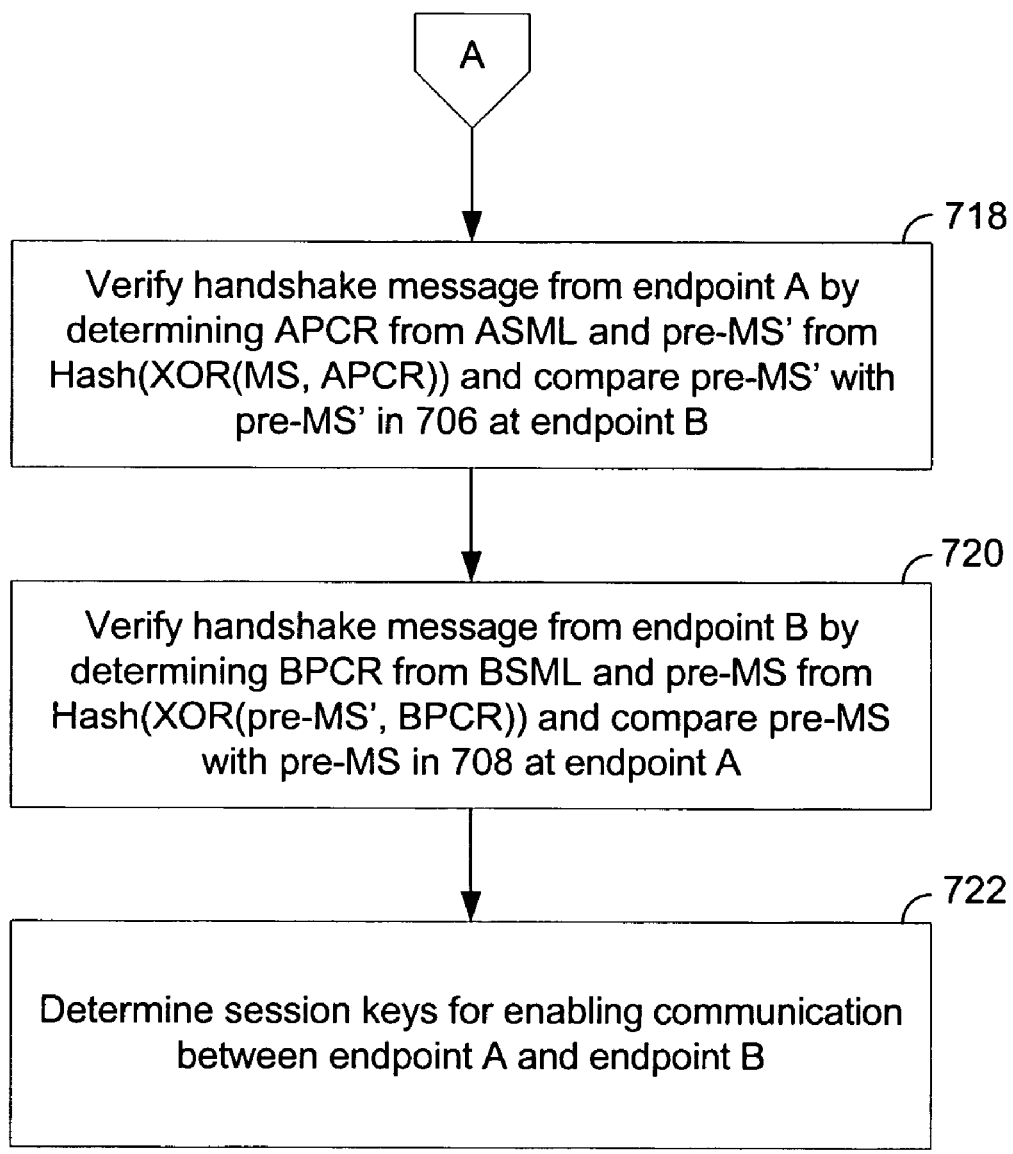

FIGS. 7A and 7B are a flow diagram describing a method for authenticating multiple identities using RSA identity keys according to an embodiment of the present invention. Although the method for authenticating multiple identities is described using RSA identity keys, one skilled in the relevant art(s) would know that other identity keys may be used as well. Thus, the invention is not limited to the embodiment described herein with respect to flow diagram 700. Rather, it will be apparent to persons skilled in the relevant art(s) after reading the teachings provided herein that other functional flow diagrams are within the scope of the invention. The process begins with block 702 in FIG. 7A, where the process immediately proceeds to block 704.

In block 704, a pre-master secret (pre-MS), sent from endpoint A 102 to endpoint B 108, contains a random nonce generated by endpoint B 108. The pre-MS is authenticated by signing the pre-MS with the platform configuration key of endpoint B 108 ([pre-MS]$_{BUK}$). Configuration data, also known as a stored measurement log (SML), for endpoint B 108 (BSML) is also included ([pre-MS]$_{BUK}$, BSML).

In block 706, the pre-MS is augmented by processor 110 with a hash of platform configuration (BPCR) values for endpoint B 108. The platform configuration is modified to incorporate the handshake state by measuring pre-MS into the PCR to yield pre-MS'. This is accomplished by performing an XOR operation using the pre-MS and the PCR values for endpoint B 108 and then hashing the result to yield pre-MS': Hash(XOR(pre-MS, BPCR))→pre-MS'.

In block 708, processor 110 at endpoint B 108 authenticates using the platform identity of endpoint B 108 by digitally signing pre-MS' with a platform ID key (BPK) and digitally signing pre-MS' with a user ID key (BUK).

Endpoint B 108 stores pre-MS, pre-MS', [pre-MS']$_{BUK}$, [pre-MS']$_{BPK}$, BPCR, and BSML, and sends each of these parameters to processor 104 at endpoint A 102 in block 710.

In block 712, processor 104 at endpoint A 102 augments the pre-MS' with a hash of the platform configuration register (PCR) values from endpoint A 102. The platform configuration of endpoint A 102 is modified to incorporate the received handshake state by measuring pre-MS' into the PCR of endpoint A 102. This is accomplished by XOR'ing pre-MS' and APCR and then hashing the result to yield the master secret (MS): Hash(XOR(pre-MS', APCR)→MS.

In block 714, processor 104 authenticates the user identity by digitally signing the MS with the user identity key (AUK) of endpoint A 102: [MS]$_{AUK}$, authenticates the platform identity by digitally signing the MS with the platform identity key (APK) of endpoint A 102: [MS]$_{APK}$, and includes the stored measurement log for endpoint A 102 (ASML).

Endpoint A 102 stores MS, [MS]$_{AUK}$, [MS]$_{APK}$, APCR, and ASML, and sends this information to endpoint B 108 in block 716.

In block 718 in FIG. 7B, endpoint B 108 verifies the handshake message from endpoint A 102 by determining APCR from ASML and pre-MS' from Hash(XOR(MS, APCR)), and compares the determined pre-MS' with pre-MS' in block 706.

In block 720, endpoint A 102 verifies the handshake message from endpoint B 108 by computing BPCR from BSML and pre-MS from Hash(XOR(pre-MS', BPCR)), and compares pre-MS with the pre-MS in block 710.

In one embodiment, blocks 718 and 720 may be performed simultaneously. In another embodiment, block 720 may be performed prior to block 718. Yet in another embodiment, block 718 is performed prior to block 720.

In block 722, session keys are determined from the accumulated hash result of the MS in block 718 if the verification of blocks 718 and 720 are correct. The session keys enable the exchange of data between endpoints A 102 and B 108 in a secure manner. At this point, both sides have the same session keys and can exchange data. All of the data that is exchanged is hashed and the session key is used to encrypt the data to provide both an encryption and a MAC (message authentication code). So basically a symmetric data integrity computation is performed. Both the client and the server are able to exchange data knowing that both the platforms have been authenticated using platform identity which ties to the trusted platform module (which may be, for example, silicon) and optionally with user authentication information. The ability now exists to have a security policy that ties the user to a platform and allows the determination of which configuration of platforms will be trusted.

Embodiments of the present invention may also use direct anonymous attestation (DAA) credentials. With DAA, a TPM can create certificates for digital signatures. This eliminates the need to purchase certificates from trusted third parties to protect user privacy. DAA credentials, which are well known in the relevant art(s), are constructed with zero knowledge proof, i.e., proof without giving any knowledge except the validity of the assertion.

Figure 3B:
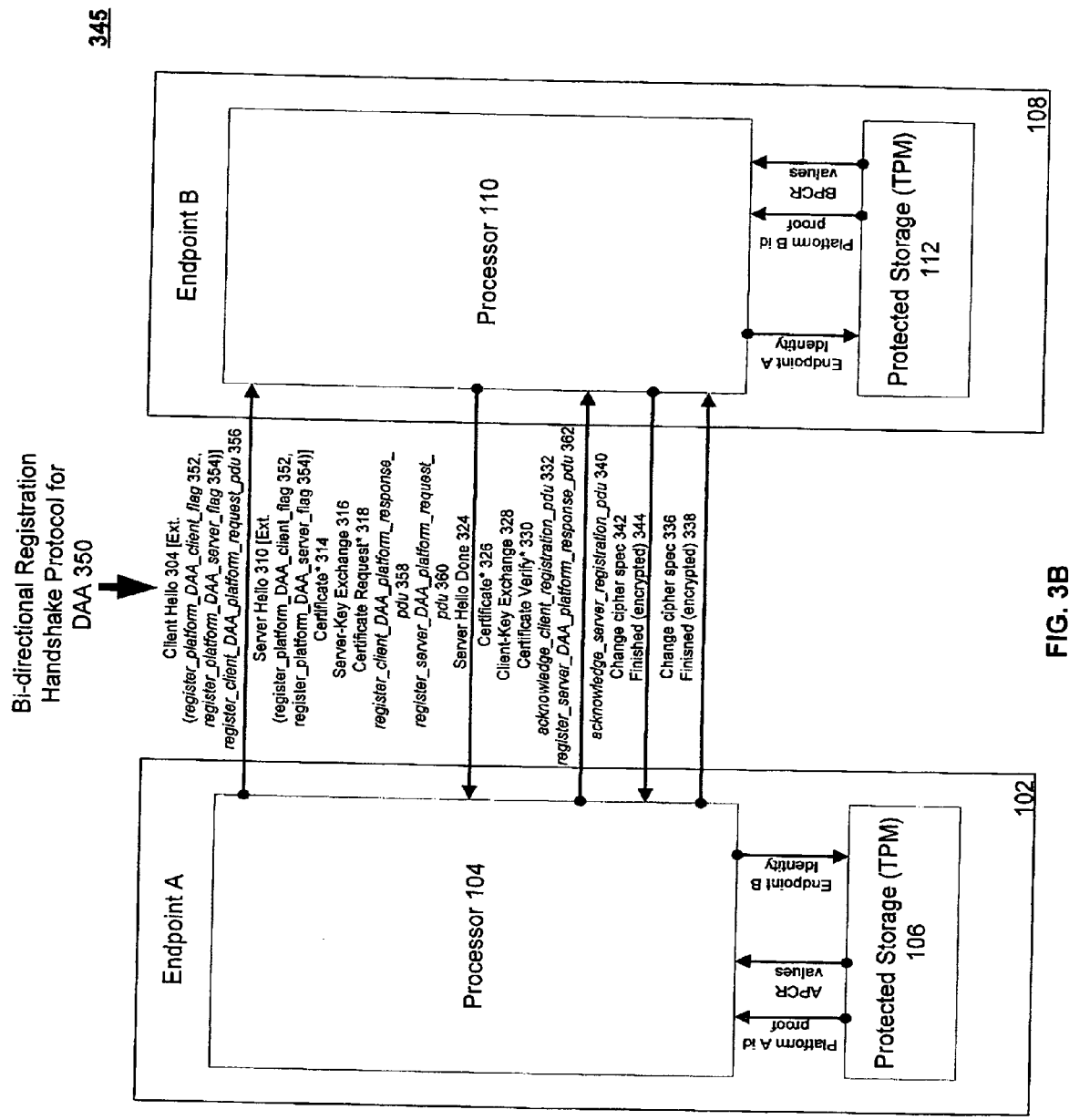
FIG. 3B is a diagram illustrating an exemplary bi-directional registration handshake protocol using a DAA (Direct Anonymous Attestation) credential according to an embodiment of the present invention.

FIG. 3B is a diagram illustrating an exemplary handshake protocol for registration using DAA credentials according to an embodiment of the present invention. FIG. 3B is similar to FIG. 3A except the attestation credentials are DM attestation credentials. FIG. 3B shows endpoint A 102 communicating with endpoint B 108 via registration handshake protocol for DAA 350. Registration handshake protocol for DAA 350 comprises client hello message 304, a register_client_DAA_platform_request_pdu 356, server hello message 310, certificate 314, server-key exchange message 316, certificate request 318, a register_client_DAA_platform_response_pdu 358, a register_server_DAA_platform_request_pdu 360, server hello done message 324, certificate 326, client-key exchange message 328, certificate verify 330, acknowledge client_registration_pdu 332, a register_server_DAA_platform_response_pdu 362, client change cipher spec message 336, client finished message 338, acknowledge_server_registration_pdu 340, server change cipher spec message 342, and server finished message 344.

Client hello message 304 includes two extension flags. The first extension flag is a register_platform_DAA_client_flag 352. Register_platform_DAA_client_flag 352 indicates to the receiving party (i.e., server) that the sender (i.e., client) wants to register with the Issuer and get a DAA credential (credDK (i.e., public portion of the DAA credential)). The second extension flag is a register_platform_DAA_server flag 354. Register_platform_DAA_server_flag 354 indicates to the receiving party (i.e., server) that the sender (i.e., client) has the capability of registering and, thus, issuing DAA credentials (credDK).

Server hello message 310 includes extension flags 352 and 354. In this instance, extension flags 352 and 354 are being sent from endpoint B 108 to endpoint A 102. Extension flag 352 indicates to the receiving party (i.e., client) that the sender (i.e., server) wants to register with the Issuer and get a DAA credential (credDK). Extension flag 354 indicates to the receiving party (i.e., client) that the sender (i.e., server) has the capability of registering and, thus, issuing DAA credentials (credDK).

Register_client_DAA_platform_request_pdu 356 comprises encrypted data required to create the DAA credential (credDK) for endpoint A 102. Register_server_DAA_platform_request_pdu 360 comprises encrypted data required to create credDK for endpoint B 108. In one embodiment, the encryption is done by the Issuer's public key.

Register_client_DAA_platform_response_pdu 358 comprises a symmetric key encrypted with the public EK (Endorsement Key) of the requestor (i.e., client) and the DAA credential (credDK) encrypted with the symmetric key. Register_server_DAA_platform_response_pdu 362 comprises a symmetric key encrypted with the public EK of the requestor (i.e., server) and the DAA credential (credDK) encrypted with the symmetricd key.

Figure 4B:
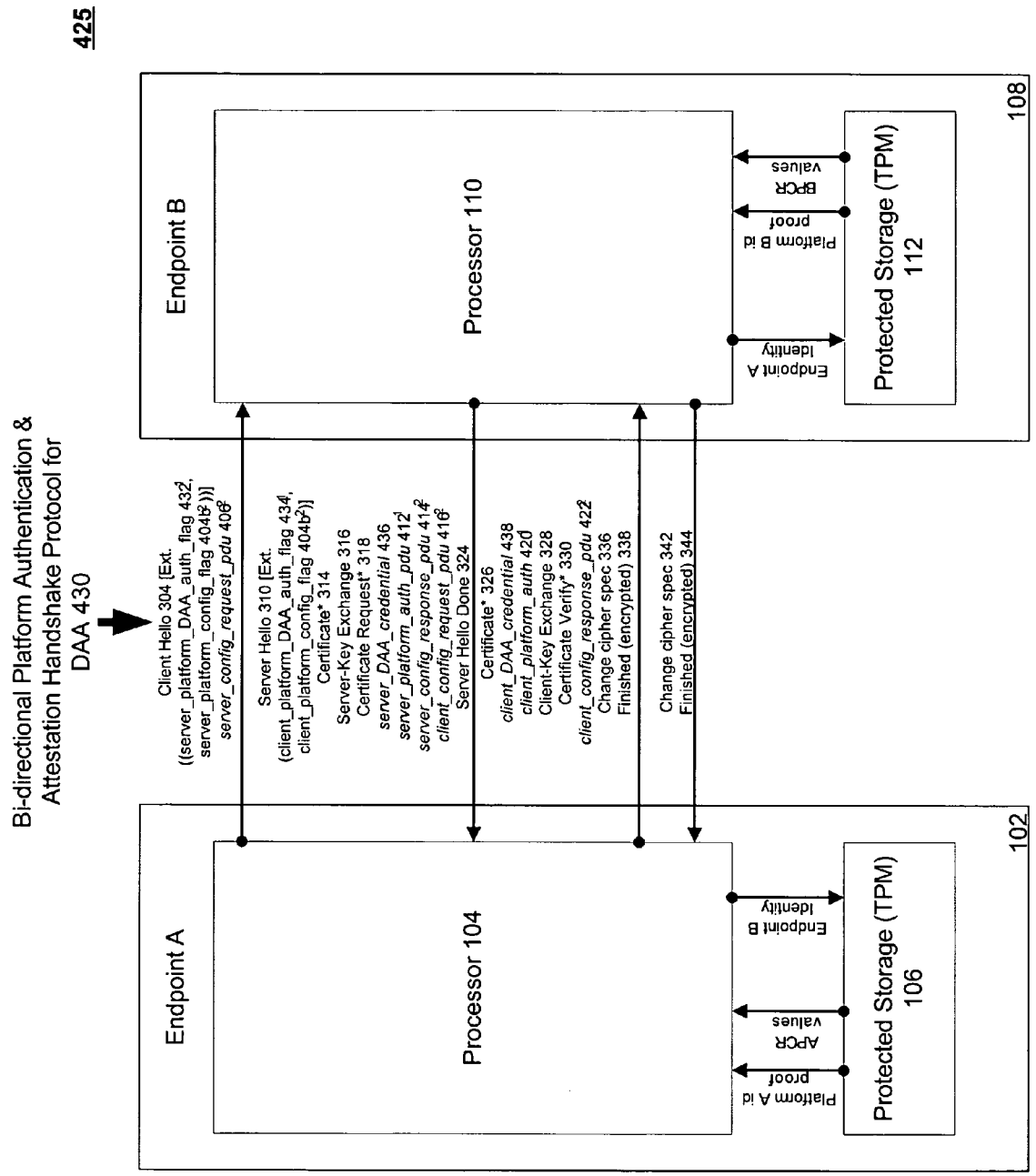
FIG. 4B is a diagram illustrating an exemplary bi-directional platform authentication and attestation handshake protocol using a DAA credential according to an embodiment of the present invention.

FIG. 4B is a diagram illustrating an exemplary handshake protocol for authentication and attestation using DAA credentials according to an embodiment of the present invention. FIG. 4B is similar to FIG. 4A except the attestation credentials are DAA attestation credentials. FIG. 4B shows endpoint A 102 communicating with endpoint B 108 via authentication and attestation handshake protocol for DAA 430. Authentication and attestation handshake protocol for DAA 430 comprises client hello message 304, server_config_request_pdu 406, server hello message 310, certificate 314, server-key exchange 316, certificate request 318, a server_DAA_credential_pdu 436, server_platform_auth_pdu 412, server_config_response_pdu 414, client_config_request_pdu 416, server hello done message 324, certificate 326, a client_DAA_credential_pdu 438, client_platform_auth_pdu 420, client-key exchange message 328, certificate verify 330, client_config_ response_pdu 422, change cipher spec 336, finished message 338, change cipher spec message 342, and finished message 344.

Client hello message 304 includes a server_platform_DAA_auth_flag 432 and server_platform_config_flag 404B as extension flags. Server_platform_DAA_auth_flag 432 indicates that the server has to send the platform authentication (AIK public key signed by privDK (i.e., the private key of the DAA credential) and certDK (i.e., the public key of the DAA credential)) and the associated proof for the AIK.

Server hello message 310 includes client_platform_DAA_auth_flag 434 and client_platform_config_flag 404B. Client_platform_DAA_auth_flag 434 indicates that the client has to send the platform authentication (AIK public key signed by privDK and certDK) and the associated proof for the AIK.

Server_DAA_credential 436 comprises an AIK public key signed by certDK and privDK (i.e., DAA signed). In one embodiment, server_DAA_credential 436 may include an IKEY_cred (Integrity Key credential) or IKEY_cred_link (Integrity Key credential link) as an option. IKEY_cred is a credential, such as a certificate, that is issued to associate the Integrity key with application defined values such as, but not limited to, a name or asset tracking number. IKEY_cred_link is a URL reference to a credential that redirects a verifier to an external server to obtain the IKEY credential. The "link" is an optimization for constrained platforms, such as, for example, a cell phone, that may not have room to store their own credentials or may optimize bandwidth use to improve transaction latency. Client_DAA_credential 438 comprises an AIK public key signed by certDK and privDK (i.e., DAA signed). In one embodiment, client_DAA_credential 436 may include an IKEY_cred or IKEY_cred_link as an option.

When resuming a session that employs DAA credentials, resumption handshake protocol 502 may be used. Resumption handshake protocol 502 is described above with reference to FIG. 5.

Certain aspects of embodiments of the present invention may be implemented using hardware, software, or a combination thereof and may be implemented in one or more computer systems or other processing systems. In fact, in one embodiment, the methods may be implemented in programs executing on programmable machines such as mobile or stationary computers, personal digital assistants (PDAs), set top boxes, cellular telephones and pagers, and other electronic devices that each include a processor, a protected storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that embodiments of the invention may be practiced with various computer system configurations, including multiprocessor systems, minicomputers, mainframe computers, and the like. Embodiments of the present invention may also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the methods described herein. Alternatively, the methods may be performed by specific hardware components that contain hardwired logic for performing the methods, or by any combination of programmed computer components and custom hardware components. The methods described herein may be provided as a computer program product that may include a machine readable medium having stored thereon instructions that may be used to program a processing system or other electronic device to perform the methods. The term "machine readable medium" or "machine accessible medium" used herein shall include any medium that is capable of storing or encoding a sequence of instructions for execution by the machine and that causes the machine to perform any one of the methods described herein. The terms "machine readable medium" and "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A security protocol method comprising:

cryptographically hashing a platform configuration value from a platform configuration register (PCR) in a trusted platform module (TPM) that indicates integrity of an endpoint platform, the platform configuration value representing a configuration state of the endpoint platform that indicates an integrity of the endpoint platform to generate a cryptographic hash of the platform configuration;

generating a master secret by hashing together the cryptographic hash of the platform configuration with a pre-master secret from which the master secret is derived, and data from a stored measurement log that stores configuration state measured values for the endpoint platform;

negotiating a communication channel;

signing the generated master secret with multiple authentication facets of the endpoint, the multiple authentication facets including a user key representing a particular user and a platform key representing the particular endpoint platform to produce a master secret signed with multiple authentication keys to authenticate the endpoint;

authenticating, as part of a bidirectional handshaking protocol exchange, the negotiated communication channel with the signed master secret to establish the negotiated communication channel as a secure channel to achieve late binding of the secure channel to prevent the binding from persisting outside the secure channel, including generating a session key for the communication channel, where the session key is generated from the master secret.

2. The method of claim 1, wherein a platform private key is bound to the platform configuration using the TPM.

3. The method of claim 2, wherein the TPM comprises a processor coupled to a protected storage device.

4. The method of claim 1, wherein cryptographically hashing the platform configuration comprises cryptographically hashing the platform configuration using a secure hashing algorithm.

5. The method of claim 4, wherein the secure hashing algorithm comprises Secure Hashing Algorithm Version 1.0 (SHA-1).

6. The method of claim 1, wherein the platform configuration includes multiple identities and the platform key includes one or more platform identity keys.

7. The method of claim 1, wherein the platform configuration includes multiple identities and the platform key includes each platform configuration identity key.

8. The method of claim 1, further comprising:
exchanging an explanation of the platform configuration hashes following session key negotiations to finalize the authentication;
verifying, at both endpoints, key exchange messages, certificates and platform configuration data; and
authenticating the session if no problems arise during verification.

9. The method of claim 8, further comprising halting the authentication session if problems arise during verification.

10. The method of claim 8, further comprising enabling endpoints to exchange data, wherein each endpoint knows that the platform from the other endpoint has been authenticated using a platform identity that ties to the trusted platform module.

11. A computer readable storage medium having instructions stored thereon, which when executed by a processor, provide for simultaneously authenticating multiple facets of an endpoint by:
cryptographically hashing a platform configuration value from a platform configuration register (PCR) in a trusted platform module (TPM) that indicates integrity of an endpoint platform, the platform configuration value representing a configuration state of the endpoint platform that indicates an integrity of the endpoint platform to generate a cryptographic hash of the platform configuration;
generating a master secret by hashing together the cryptographic hash of the platform configuration with a pre-master secret from which the master secret is derived, and data from a stored measurement log that stores configuration state measured values for the endpoint platform;
negotiating a communication channel;
signing the generated master secret with multiple authentication facets of the endpoint, the multiple authentication facets including a user key representing a particular user and a platform key representing the particular endpoint platform to produce a master secret signed with multiple authentication keys to authenticate the endpoint;
authenticating, as part of a bidirectional handshaking protocol exchange, the negotiated communication channel with the signed master secret to establish the negotiated communication channel as a secure channel to achieve late binding of the secure channel to prevent the binding from persisting outside the secure channel, including generating a session key for the communication channel, where the session key is generated from the master secret.

12. The computer readable storage medium of claim 11, wherein a platform private key is bound to the platform configuration using the TPM.

13. The computer readable storage medium of claim 12, wherein the TPM comprises a processor coupled to a protected storage device.

14. The computer readable storage medium of claim 11, wherein instructions for cryptographically hashing the platform configuration comprises instructions for cryptographically hashing the platform configuration using a secure hashing algorithm.

15. The computer readable storage medium of claim 14, wherein the secure hashing algorithm comprises Secure Hashing Algorithm Version 1.0 (SHA-1).

16. The computer readable storage medium of claim 11, wherein the platform configuration includes multiple identities and the platform key includes one or more platform identity keys.

17. The computer readable storage medium of claim 11, further comprising instructions for:
exchanging an explanation of the platform configuration hashes following session key negotiations to finalize the authentication;
verifying, at both endpoints, key exchange messages, certificates and platform configuration data; and
authenticating the session if no problems arise during verification.

18. The computer readable storage medium of claim 17, further comprising instructions for halting the authentication session if problems arise during verification.

19. The computer readable storage medium of claim 17, further comprising instructions for enabling endpoints to exchange data, wherein each endpoint knows that the platform from the other endpoint has been authenticated using a platform identity that ties to the trusted platform module.

\* \* \* \* \*